US010960805B2

(12) United States Patent
Nagai et al.

(10) Patent No.: US 10,960,805 B2
(45) Date of Patent: Mar. 30, 2021

(54) VEHICLE SEAT HAVING LOCKING ELEMENT AND RECEIVING ELEMENT

(71) Applicant: Toyota Jidosha Kabushiki Kaisha, Toyota (JP)

(72) Inventors: Tetsuya Nagai, Okazaki (JP); Takashi Sugimoto, Anjyo (JP); Osamu Oda, Toyota (JP); Kohshi Katoh, Toyota (JP); Akira Takinami, Toyota (JP); Masatoshi Hada, Nagakute (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/571,567

(22) Filed: Sep. 16, 2019

(65) Prior Publication Data

US 2020/0086776 A1    Mar. 19, 2020

(30) Foreign Application Priority Data

Sep. 19, 2018    (JP) .............................. JP2018-174523

(51) Int. Cl.
*B60N 2/90*    (2018.01)
*B60N 2/39*    (2006.01)

(52) U.S. Cl.
CPC ............... *B60N 2/938* (2018.02); *B60N 2/39* (2013.01); *B60N 2002/952* (2018.02)

(58) Field of Classification Search
CPC .... B60N 2/39; B60N 2/938; B60N 2002/952; B60N 2/2218; B60N 2002/026; B60N 2002/0212; B60N 2002/0208; B60N 2/919; B60N 2/22; B60N 2002/022; B60N 2/62; B60N 2/64
USPC .......................................................... 297/314
See application file for complete search history.

(56) References Cited

U.S. PATENT DOCUMENTS 4,183,492 A  *  1/1980  Meiller .................... B60N 2/02
                                                          248/395
2015/0306982 A1    10/2015  Hamabe

FOREIGN PATENT DOCUMENTS

JP           2015209131 A       11/2015

* cited by examiner

*Primary Examiner* — Milton Nelson, Jr.
(74) *Attorney, Agent, or Firm* — Dinsmore & Shohl LLP

(57) ABSTRACT

A locking block is fixed with respect to a seat cushion. A locking pin which can advance and retract relative to the locking block is provided on a main frame side. A V groove shape receptacle is formed on the locking block. When the locking pin is advanced into the receptacle portion, the locking pin is guided by a receiving inclined surface of the receptacle portion forming the V-shape groove, and advances to a bottom of the receptacle portion. With this process, the locking block moves in a rotational direction B, and when the locking pin engages the bottom, the seat cushion is fixed.

6 Claims, 6 Drawing Sheets

VEHICLE SEAT HAVING LOCKING ELEMENT AND RECEIVING ELEMENT

CROSS REFERENCE TO RELATED APPLICATION

This application claims priority to Japanese Patent Application No. 2018-174523 filed on Sep. 19, 2018, which is incorporated herein by reference in its entirety including the specification, claims, drawings, and abstract.

TECHNICAL FIELD

The present disclosure relates to a vehicle seat, and in particular to a seat cushion.

BACKGROUND

Vehicle seats are known which allow movements of a seat cushion and a seat back with respect to a frame of the vehicle seat. For example, JP 2015-209131 A discloses a vehicle seat device (1) which allows movements of a seat cushion (7) and a seat back (8) with respect to a seat frame (3). The seat cushion (7) is rotatable about a rotational axis (A) which passes through a waist part of a seated passenger and which is inclined such that a front part is lower. In addition, the seat back (8) is rotatable about a rotational axis (B) which passes through a chest part of the passenger and which extends in a front-and-rear direction.

The seat cushion (7) of JP 2015-209131 A comprises a gear (18a) which has a plurality of teeth, and fixation teeth (19) which can be engaged with the gear (18a) are provided at the side of the seat frame (3). The seat cushion (7) is fixed at a position where the fixation teeth (19) are engaged with the gear (18a).

In the above description, reference numerals in parentheses are reference numerals used in JP 2015-209131 A, and are not related to the reference numerals used in the description of an embodiment of the present disclosure.

In a vehicle seat, when a movable seat cushion is to be fixed, the passenger may desire to return the seat cushion at a predetermined position and fix the seat cushion, for example, at a neutral position.

An advantage of the present disclosure lies in fixation of a movable seat cushion at a predetermined position.

SUMMARY

According to one aspect of the present disclosure, there is provided a vehicle seat comprising a main frame and a seat cushion which is rotatably supported on the main frame. A single locking element is provided on one of the main frame and the seat cushion, and a receiving element having a single receptacle portion having a recessed shape for receiving the locking element is provided on the other of the main frame and the seat cushion. The receptacle portion of the receiving element has two side surfaces which oppose each other in a direction of rotation of the seat cushion, and the side surfaces have receiving inclined surfaces which are inclined to be narrowed from an opening toward a bottom. Further, the vehicle seat comprises a drive element that drives at least one of the locking element and the receiving element, to advance and retract the locking element relative to the receiving element. When the locking element is guided on the receiving inclined surface and advances to the bottom of the receptacle portion, the seat cushion moves toward a predetermined position, and, when the locking element engages the bottom of the receptacle portion, the seat cushion is fixed at the predetermined position.

According to this structure, the seat cushion can be returned to a predetermined position, and fixed at the predetermined position.

According to another aspect of the present disclosure, the two side surfaces of the receptacle portion may have, at the bottom of the receptacle portion, a locking orthogonal surface which is orthogonal to the direction of rotation of the cushion seat, and which opposes the engaged locking element. With this structure, when an attempt is made to move the fixed cushion, a force to retract the locking element does not act on the locking element.

According to another aspect of the present disclosure, the locking element may have, at a portion in contact with the receiving inclined surface, a ring member which rotationally moves when the locking element moves along the receiving inclined surface. With this structure, friction arising when the locking element is guided on the receiving inclined surface can be reduced.

According to another aspect of the present disclosure, the locking element may have a holding structure which holds the locking element at the bottom of the receptacle portion. With this structure, energy such as electric force for holding the locking element at the bottom of the receptacle portion can be reduced.

According to another aspect of the present disclosure, the holding structure which holds the locking element at the bottom of the receptacle portion may include a permanent magnet provided on one of the locking element and the receiving element, and a permanent magnet or a magnetic member provided on the other of the locking element and the receiving element. With this configuration, the locking element is held by a magnetic force.

According to various aspects of the present disclosure, the movable seat cushion can be returned to a predetermined position and fixed thereat.

BRIEF DESCRIPTION OF DRAWINGS

Embodiment(s) of the present disclosure will be described by reference to the following figures, wherein.

DESCRIPTION OF EMBODIMENTS

Figure 1:
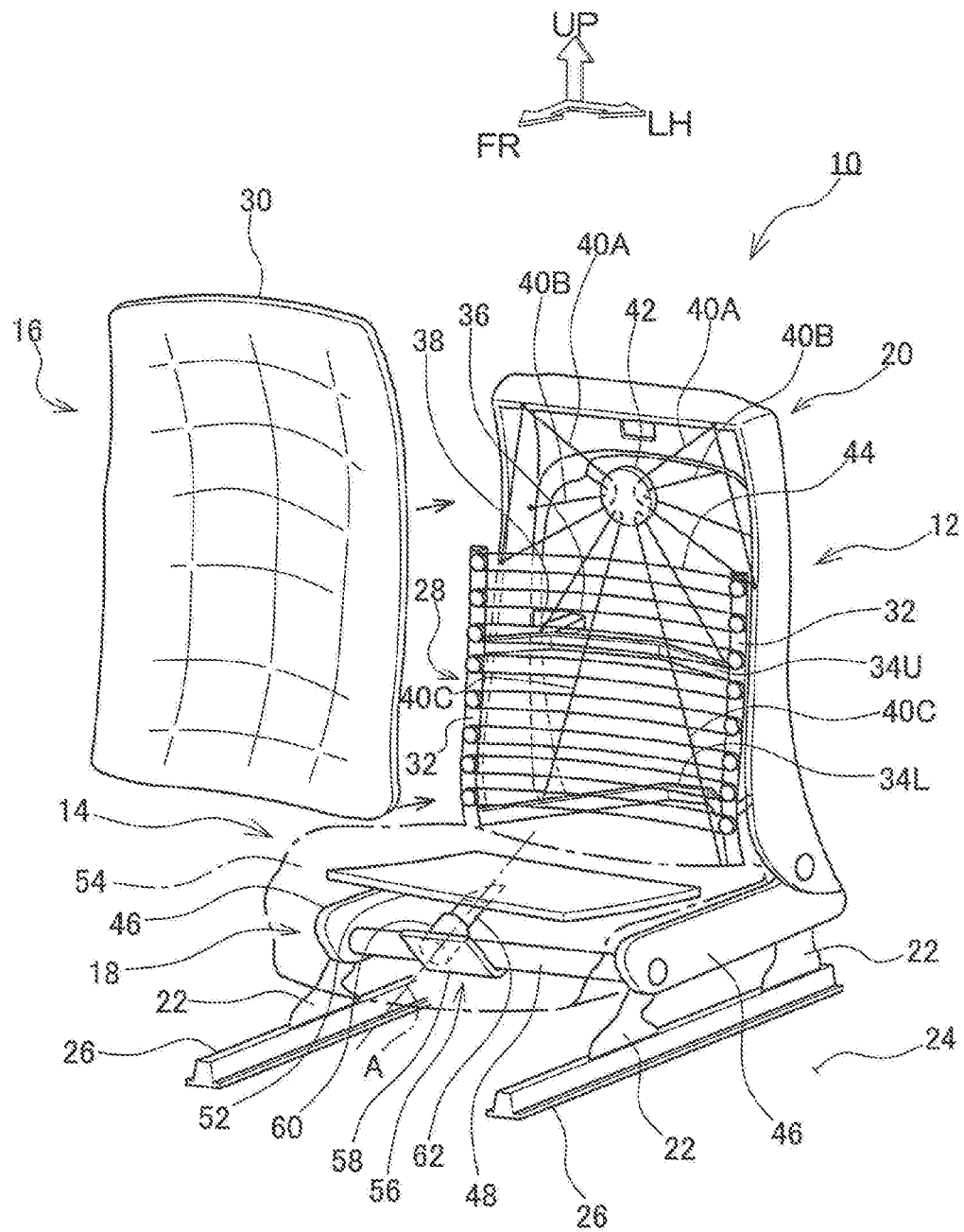
FIG. 1 is an exploded perspective diagram of a vehicle seat according to an embodiment of the present disclosure.

A vehicle seat 10 according to an embodiment of the present disclosure will now be described with reference to the drawings. In the following description, unless otherwise specified, terms of relative positions and directions such as front, forward, rear, rearward, left, right, side, upper, upward, lower, downward, and the like show positions and directions with respect to a passenger seated on the vehicle seat 10. A front-and-rear direction of the vehicle is described as a longitudinal direction, a left-and-right direction of the vehicle is described as a lateral direction, and an up-and-down direction is described as a vertical direction. In the drawings, a direction of an arrow FR shows a front direction, a direction of an arrow UP shows an upward direction, and a direction of an arrow LH shows a left side.

Figure 2:
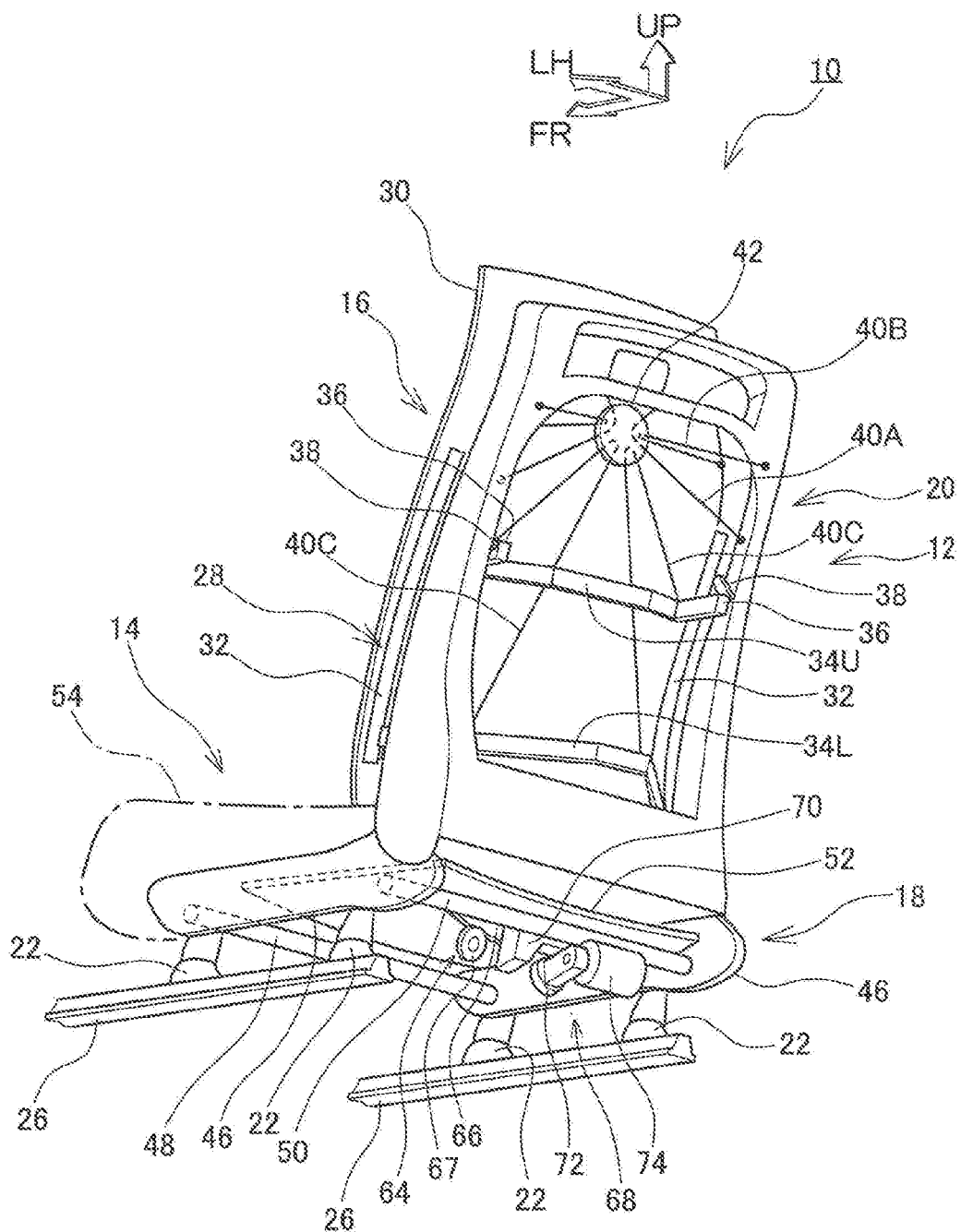
FIG. 2 is a perspective diagram of a vehicle seat according to an embodiment of the present disclosure, viewed from a rear and lower side.

FIGS. 1 and 2 are perspective diagrams schematically showing an outline structure of the vehicle seat 10. FIG. 1 is a diagram showing the vehicle seat 10 in a state of looking down from a left front side, and shows a state in which some components are removed. FIG. 2 is a diagram showing the vehicle seat 10 in a state of looking up from a left rear side. The vehicle seat 10 is a seat applied to an automobile such as a passenger car. The vehicle seat 10 comprises a main frame 12 which is mounted directly on a vehicle body, and a seat cushion 14 and a seat back 16 which are movably supported on the main frame 12. In FIG. 1, the seat cushion 14 is shown in a state where internal structures can be seen through external elements. The seat cushion 14 supports a buttock and a thigh of the passenger from below, and the seat back 16 supports an upper body of the passenger from behind.

The main frame 12 comprises a seat cushion frame 18 which supports the seat cushion 14, and a seat back frame 20 which supports the seat back 16. The seat cushion frame 18 has seat legs 22 at four corners on a lower side. The seat legs 22 are slidably engaged on a pair of floor rails 26 which are fixed on a floor 24 of the vehicle and which extend in the longitudinal direction of the vehicle. With this structure, the vehicle seat 10 is mounted on the floor 24 in a slidable manner in the longitudinal direction of the vehicle. The seat back frame 20 has a reversed U shape when viewed from the front, and a lower end thereof is coupled to a rear end of the seat cushion frame 18. The seat back frame 20 is coupled to the seat cushion frame 18 in a rotatable manner about an axis which extends along the left-and-right direction. By rotating the seat back frame 20 with respect to the seat cushion frame 18, it is possible to adjust an inclination of the seat back 16.

The seat back 16 includes a seat back sub-frame 28 which is hung and supported on the seat back frame 20, and a seat back pad 30 which is attached to the seat back sub-frame 28. The seat back sub-frame 28 includes a pair of upright members 32 which extend approximately along the vertical direction on left and right sides of the vehicle seat 10, and two lateral members 34U and 34L connecting the left and right upright members 32 and placed approximately along the lateral direction. Of the two lateral members, a lateral member positioned at an upper side is described as the upper lateral member 34U and a lateral member positioned at a lower side is described as the lower lateral member 34L. The upper lateral member 34U is connected to two upright members 32 at a position slightly above a center of the upright members 32 in the vertical direction, and the lower lateral member 34L is connected to the two upright members 32 at lower ends of the two upright members 32. On left and right ends of the upper lateral member 34U, spring-receiving brackets 36 which protrude toward the rear side are fixed. At a rear end of each of the spring-receiving brackets 36, a rear end of a return spring 38 which is a leaf spring is fixed, and a front end of the return spring 38 is fixed to the seat back frame 20. The return spring 38 which is a leaf spring is placed in an orientation in which a thickness direction is along the lateral direction. With the return spring 38 being deflected, a movement in a lateral direction of the seat back sub-frame 28 with respect to the seat back frame 20 is allowed. In addition, with an elastic force of the return spring 38, the seat back sub-frame 28 is returned to a neutral position at a center of a width of the vehicle seat 10.

The seat back sub-frame 28 is hung and supported on the seat back frame 20 via a plurality of hanging wires 40A, 40B, and 40C. By two hanging wires 40A and 40B on each of left and right sides, a relay disk 42 is hung from the seat back frame 20, and by one hanging wire 40C at each of the left and right sides, the seat back sub-frame 28 is hung from the relay disk 42. The hanging wire 40A has an endless shape, and is bridged over two points on the seat back frame 20 and the relay disk 42. The hanging wire 40B has respective ends coupled to two points on the seat back frame 20, and an intermediate portion suspended over the relay disk 42. The hanging wire 40C has one end coupled to the upper lateral member 34U of the seat back sub-frame 28, the other end coupled to the lower lateral member 34L, and an intermediate portion suspended over the relay disk 42.

A plurality of bridging wires 44 are bridged in the left-and-right direction between the left and right upright members of the seat back sub-frame 28. The bridging wires 44 supports the seat back pad 30 from behind, and bear the load from the passenger. It is noted that the bridging wires 44 are omitted in FIG. 2.

The seat cushion frame 18 includes a pair of side plates 46 which are placed at left and right of the seat cushion 14 and which extend in the front-and-rear direction, and two bars 48 and 50 connecting the left and right side plates 46. Of the two bars 48 and 50, the front-side bar 48 positioned at the front side connects the side plates 46 at front ends of the side plates 46. Similarly, the rear-side bar 50 positioned at the rear side connects the side plates 46 at rear ends of the side plates 46.

The seat cushion 14 includes a cushion pan 52 movably supported on the seat cushion frame 18, and a cushion pad 54 attached on the cushion pan 52. The cushion pan 52 is supported on the seat cushion frame 18 by support mechanisms positioned at a front side and a rear side. A front-side support mechanism 56 includes a bracket 58 fixed on the front-side bar 48, a bearing 60 fixed on the bracket 58, and an axle 62 fixed on the cushion pan 52. The axle 62 is rotatably supported on the bearing 60, and the cushion pan 52 rotates about an axis A of the axle 62. The axis A passes through the waist part of the seated passenger, and is inclined such that the front side is lowered. A rear-side support mechanism 64 includes a guide rail 66 fixed on the cushion pan 52, and a roller 67 fixed with respect to the seat cushion frame 18. In the figures, only relevant portions of the structures of the rear-side support mechanism 64 are shown, and a structure for supporting the roller 67 or the like is not shown. The guide rail 66 has an arc shape guide surface centered at the rotational axis A of the cushion pan 52. The rollers 67 are placed at two locations, and are in contact with the guide surface of the guide rail 66. With the support by the front-side support mechanism 56 and by the rear-side support mechanism 64, the cushion pan 52 rotates about the rotational axis A.

Further, the vehicle seat 10 has a fixation mechanism 68 for fixing the seat cushion 14. FIG. 2 only shows primary elements of the fixation mechanism 68. The fixation mechanism 68 includes one locking block 70 fixed with respect to the cushion pan 52, one locking pin 72 provided on the side of the seat cushion frame 18, and which can engage the locking block 70, and a rotary solenoid actuator 74 (hereinafter, "rotary actuator 74") which drives the locking pin 72. The locking block 70 has one receptacle portion 76 (refer to FIG. 4) having a V groove shape, and the locking pin 72 advances and retracts relative to the receptacle portion 76 by the rotary actuator 74. When the locking pin 72 moves forward and engages a bottom of the receptacle portion 76, the seat cushion 14 is fixed at a predetermined position, defined by a placement of the receptacle portion 76. In the vehicle seat 10, the seat cushion 14 is fixed at a neutral position; that is, a position having no inclination of the seat cushion 14 in the lateral direction. The locking block 70 functions as a receiving element having the receptacle portion 76 which receives the locking pin 72 serving as a locking element.

Figure 3:
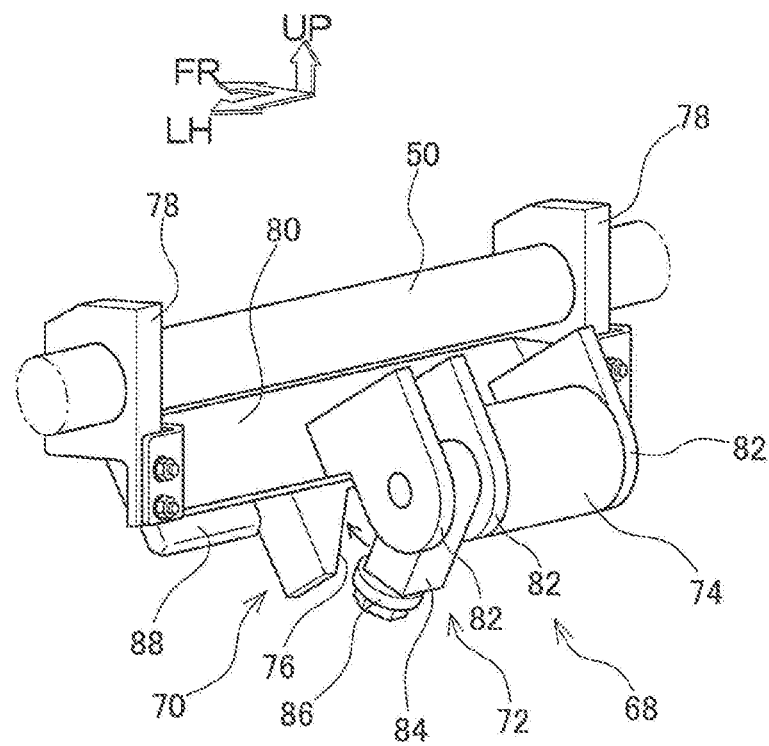
FIG. 3 is a perspective diagram showing details of a fixation mechanism.
Figure 4:
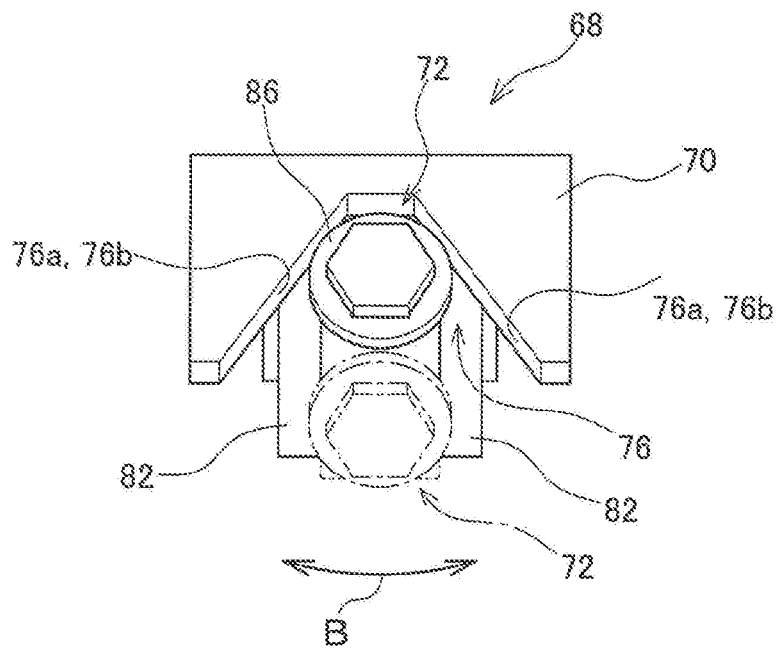
FIG. 4 is a diagram showing a fixation mechanism viewed from a front side.

FIG. 3 is a perspective diagram showing a more detailed structure of the fixation mechanism 68. FIG. 4 is a diagram showing the locking block 70 and the locking pin 72 in a state of looking slightly upward from the front. A fixation-side support plate 80 is fixed via two fixation brackets 78 on the rear-side bar 50 of the seat cushion frame 18. The fixation-side support plate 80 supports the locking pin 72 and the rotary actuator 74 via three fixation plates 82. Each fixation plate 82 is fixed, for example, by bolt fastening from a back side of the fixation-side support plate 80. One of the fixation plates 82 is placed between the rotary actuator 74 and the locking pin 72, another fixation plate 82 is placed at an end opposite from the rotary actuator 74, and the remaining fixation plate 82 is placed at an end opposite from the locking pin 72. With this structure, the rotary actuator 74 and the locking pin 72 are respectively supported by the fixation plates 82 at left and right sides. The locking pin 72 includes a polygonal prism shape arm 84, and a ring 86 provided at a tip of the arm 84. The ring 86 is equipped on the arm 84 in a rotatable manner about an axis parallel to a central axis of the arm 84. The ring 86 may be realized, for example, using a ball bearing. An inner race of the ball bearing is fastened on an end surface of the arm 84 by a bolt or the like. In this process, an outer race of the ball bearing is rotatable with respect to the arm 84.

The locking block 70 is fixed on a rotation-side support plate 88 which is fixed with respect to the cushion pan 52. The locking block 70 has the receptacle portion 76 of V groove shape, opened in the downward direction. In the receptacle portion 76, two side surfaces 76a forming the V shape oppose each other in a rotational direction B of the seat cushion 14, and are inclined to be narrowed from the opening of the V shape toward the bottom. This surface which is inclined will hereinafter be referred to as a receiving inclined surface 76b. In this example configuration, an entirety of the side surface 76a is the receiving inclined surface 76b.

The locking pin 72 is driven by the rotary actuator 74, and a tip thereof advances and retracts relative to the receptacle portion 76 of the locking block 70. A position of the locking pin 72 shown in FIG. 4 by a one-dot-and-chain line is a retracted position. A position shown by a solid line is an advanced position. At the advanced position, the locking pin 72 is in contact with the side surfaces 76a on both sides of the receptacle portion 76, and fixes the locking block 70 at this position with regard to the rotational direction. With this process, the seat cushion 14 is fixed. In the vehicle seat 10, the seat cushion 14 when fixed by the fixation mechanism 68 is at the neutral position, and the orientation thereof is horizontal in the lateral direction.

Figure 5:
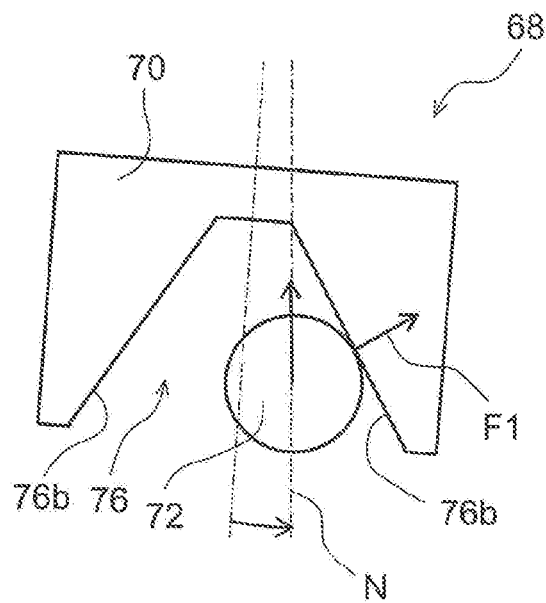
FIG. 5 is an explanatory diagram of an operation of a fixation mechanism.

FIG. 5 is a diagram showing an engagement process of the locking pin 72. The locking block 70 is at a position deviated from a neutral position N. An opening of the locking block 70 has a size so as to allow reception of the locking pin 72 by the receptacle portion 76 at every position of the seat cushion 14. Therefore, when the seat cushion 14 is positioned at an end in a rotation range, and the locking pin 72 is advanced toward the locking block 70, the locking pin 72 contacts the receiving inclined surface 76b. When the locking pin 72 advances to the receptacle portion 76, the locking pin 72 contacts one of the receiving inclined surfaces 76b. The locking pin 72 exerts a force F1 on the locking block 70. With the force F1 and a motion of the seat cushion 14 due to motion(s) of the vehicle and/or the passenger, the locking block 70 moves toward the neutral position N with the advancement of the locking pin 72. When the locking pin 72 contacts the left and right receiving inclined surfaces 76b, the locking pin 72 stops. The position of the locking block 70 at this point is the neutral position N. By retracting the locking pin 72 from the bottom of the receptacle portion 76, it becomes possible to rotate the seat cushion 14.

When the locking pin 72 is guided along the receiving inclined surface 76b, the ring 86 rotationally moves. With this movement, a frictional force during movement of the locking pin 72 can be reduced. In addition, a flexible material such as rubber may be attached on an outer circumference of the receiving inclined surface 76b or the ring 86. With this configuration, a hitting sound when the locking pin 72 collides with the locking block 70 can be reduced.

Figure 6:
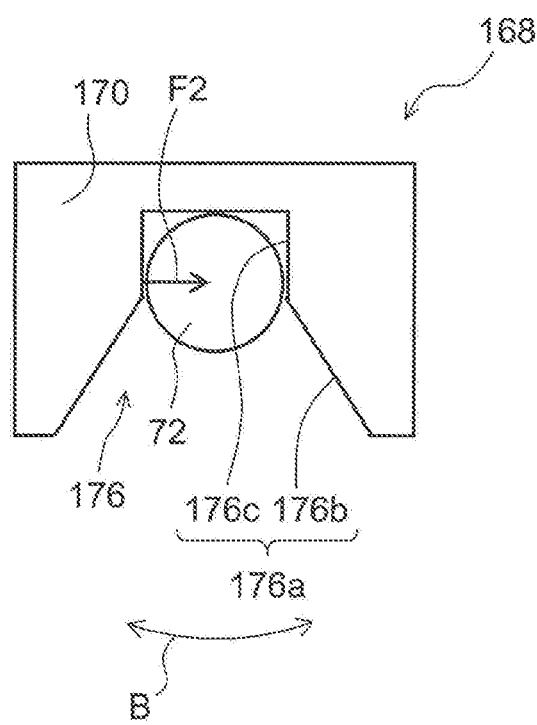
FIG. 6 is a diagram showing another configuration of the fixation mechanism.
Figure 7:
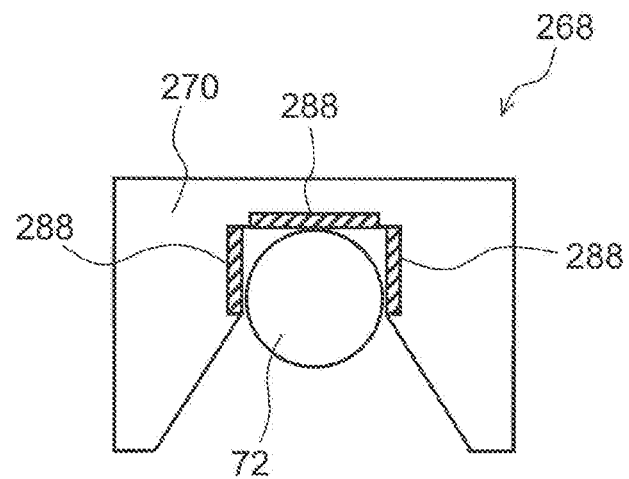
FIG. 7 is a diagram showing another configuration of the fixation mechanism.
Figure 8:
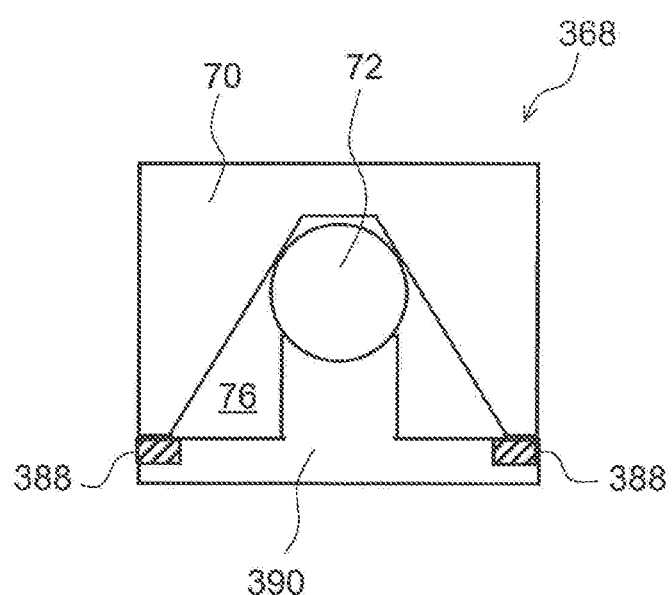
FIG. 8 is a diagram showing another configuration of the fixation mechanism.

In order to fix the seat cushion 14 at the neutral position N, the locking pin 72 must be positioned at the bottom of the locking block 70. In this process, it is not efficient to maintain the position by continuing to supply electric power to the rotary actuator 74. FIGS. 6 to 8 show example structures of the fixation mechanism having a structure which helps maintain the locking pin 72 at the bottom of the locking block.

A fixation mechanism 168 shown in FIG. 6 is characterized in a shape of a receptacle portion 176 of a locking block 170. The locking pin 72 has a structure identical to that described above. A side surface 176a of the receptacle portion 176 opposing the rotational direction has a receiving inclined surface 176b inclined to be narrowed from the opening toward the bottom, and a locking orthogonal surface 176c, at the bottom of the receptacle portion 176, which is orthogonal to the rotational direction B, and which opposes the engaged locking element. When the locking pin 72 is positioned at the bottom of the receptacle portion 176, the locking pin 72 opposes the locking orthogonal surface 176c. When the seat cushion 14 attempts to move from the neutral position N, a force F2 is exerted from the locking orthogonal surface 176c to the locking pin 72. The force F2 does not have a component in a direction orthogonal to the rotational direction B; that is, a direction to push the locking pin 72 out of the receptacle portion 176. Thus, the structure helps maintain the locking pin 72 at the bottom.

In a locking block 270 of a fixation mechanism 268 shown in FIG. 7, a permanent magnet 288 is placed at the bottom of the locking block 170 described above. At a portion of the locking pin 72 opposing the permanent magnet 288, a magnetic element is placed. By the permanent magnet 288 attracting and attaching to the locking pin 72, the locking pin 72 is held at the bottom. The permanent magnet 288 and the structure related to the permanent magnet 288 function as a holding structure which holds the locking pin 72 at the bottom. When the locking pin 72 is retracted, the rotary actuator 74 is operated in a reverse direction from the direction for the advancement. Alternatively, a permanent magnet may be placed also on the locking pin 72, to generate the attraction and attachment force between the locking pin 72 and the permanent magnet 288.

FIG. 8 is a diagram showing a fixation mechanism 368 of another configuration using the permanent magnet. In the fixation mechanism 368, the structure of the locking block 70 is similar to that in the fixation mechanism 68. A magnet holder 390 is integrally provided on the locking pin 72, and the magnet holder 390 advances and retracts relative to the locking block 70, integral with the locking pin 72. The magnet holder 390 holds a permanent magnet 388 at a position corresponding to an edge of the opening of the locking block 70. In addition, the locking block 70 is formed from a magnetic element. When the locking pin 72 reaches the bottom of the receptacle portion 76, the permanent magnet 388 is attracted and attached to the locking block 70, to thereby maintain the position of the locking pin 72. The permanent magnet 388 and the structures related thereto function as a holding structure which holds the locking pin 72 at the bottom. When the locking pin 72 is retracted, the rotary actuator 74 is operated in a reverse direction from the direction for the advancement. Alternatively, the permanent magnet may be placed at the side of the locking block. In this case, the magnetic holder is formed from a magnetic element. Alternatively, permanent magnets may be placed on both the locking block and the magnet holder.

Alternatively, in the fixation mechanism 68, a configuration may be employed in which the locking block 70 is placed such that the opening is directed upward, and the locking pin 72 is advanced from above, with respect to the locking block 70. In this case, the force of gravity acting on the locking pin 72 may be used for holding the locking pin 72 within the locking block 70. This configuration may be employed similarly in other fixation mechanisms.

Figure 9A:
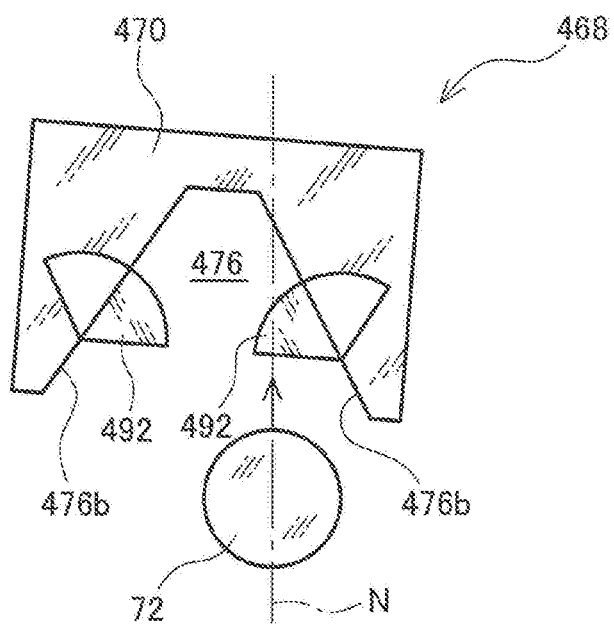
FIG. 9A is a diagram showing another configuration of the fixation member, and showing a state before a locking pin advances toward a locking block.
Figure 9B:
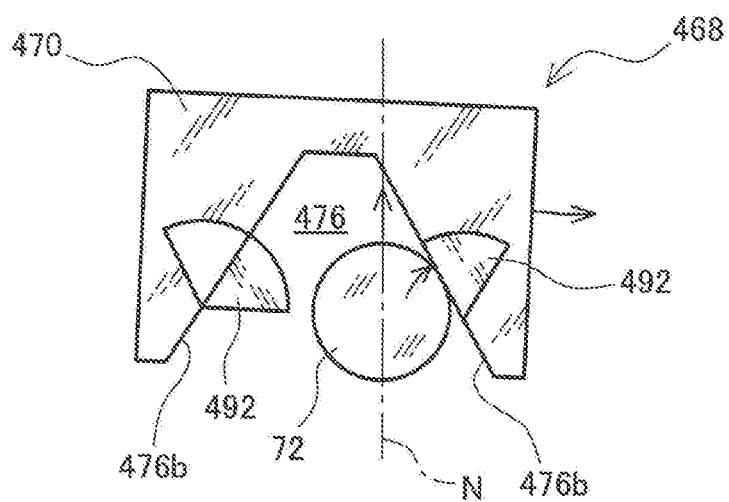
FIG. 9B is a diagram showing the fixation mechanism of FIG. 9A, in a state where the locking pin is advancing.
Figure 9C:
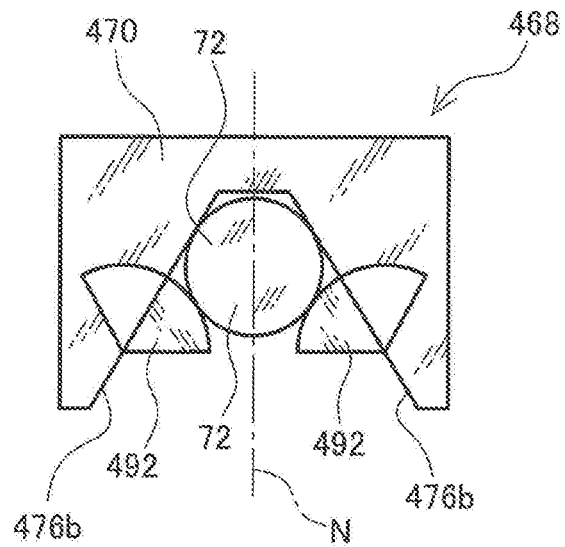
FIG. 9C is a diagram showing the fixation mechanism of FIG. 9A, in a state where the locking pin is housed in the locking block.

FIGS. 9A, 9B, and 9C are diagrams schematically showing a fixation mechanism 468 having a mechanical mechanism which holds the locking pin 72 in the locking block. Similar to the locking block 70 described above, a locking block 470 has a V groove shape, receptacle portion 476. In the locking block 470, a latch 492 is provided on each of receiving inclined surfaces 476b which are side surfaces of the V-shape groove. The latch 492 is movable between a position, as shown by a right-side latch 492 in FIG. 9B, where the latch 492 is housed in the receiving inclined surface 476b, and a position, as shown by a left-side latch 492 in FIG. 9B, where the latch 492 protrudes from the receiving inclined surface 476b. The latch 492 is urged by an elastic member toward the protruded position. At a normal time, the latch 492 is at the protruded position, as shown in FIG. 9A. When the locking pin 72 advances toward the locking block 470 and contacts the latch 492, as shown in FIG. 91, the locking pin 72 presses the latch 492 to the housed position. When the locking pin 72 reaches the bottom of the receptacle portion 476, as shown in FIG. 9C the latch 492 is detached from the locking pin 72, and is returned from the housed position to the protruded position. The protrudes latch 492 narrows the opening of the receptacle portion 476, and contacts the locking pin 72 to hold the locking pin 72 at the bottom of the receptacle portion 476.

When the locking pin 72 is released from the held state, the latch 492 is moved to the housed position by an electromagnetic force or mechanically.

In the embodiments described above, a configuration is described in which the locking pin 72 rotates and advances/retracts along a direction orthogonal to the axis of the locking pin. The present disclosure, however, is not limited to such a configuration, and, alternatively, a structure may be employed in which the locking pin 72 advances and retracts along the direction of the axis. Alternatively, the orientation of the opening of the locking block 70 is not limited to downward, and the opening may be oriented in a direction orthogonal to the rotational direction of the seat such as upward, rearward, or frontward. Alternatively, a plurality of pairs of the locking pin and locking block may be placed for one vehicle seat. Alternatively, the locking block may be placed on the side of the seat cushion frame and the locking pin may be placed on the side of the seat cushion. Alternatively, the locking pin may be fixed, and the locking block may be advanced or retracted relative to the locking pin.

REFERENCE SIGNS LIST

10 VEHICLE SEAT; 12 MAIN FRAME; 14 SEAT CUSHION; 16 SEAT BACK; 18 SEAT CUSHION FRAME; 20 SEAT BACK FRAME; 22 SEAT LEG; 24 FLOOR; 26 FLOOR RAIL; 28 SEAT BACK SUB-FRAME; 30 SEAT BACK PAD; 32 UPRIGHT MEMBER; 34U UPPER LATERAL MEMBER; 34L LOWER LATERAL MEMBER; 36 SPRING-RECEIVING BRACKET; 38 RETURN SPRING; 40A, 40B, 40C HANGING WIRE; 42 RELAY DISK; 44 BRIDGING WIRE; 46 SIDE PLATE; 48 FRONT-SIDE BAR; 50 REAR-SIDE BAR; 52 CUSHION PAN; 54 CUSHION PAD; 56 FRONT-SIDE SUPPORT MECHANISM; 58 BRACKET; 60 BEARING; 62 AXLE; 64 REAR-SIDE SUPPORT MECHANISM; 66 GUIDE RAIL; 67 ROLLER; 68, 168, 268, 368, 468 FIXATION MECHANISM; 70, 170, 270, 470 LOCKING BLOCK (RECEIVING ELEMENT); 72 LOCKING PIN (LOCKING ELEMENT); 74 ROTARY ACTUATOR (DRIVE ELEMENT); 76, 176, 476 RECEPTACLE PORTION; 76a, 176a SIDE SURFACE; 76b 176b, 476b RECEIVING INCLINED SURFACE; 176c LOCKING ORTHOGONAL SURFACE; 78 FIXATION BRACKET; 80 FIXATION-SIDE SUPPORT PLATE; 82 FIXATION PLATE; 84 ARM; 86 RING; 288, 388 PERMANENT MAGNET (HOLDING STRUCTURE); 390 MAGNET HOLDER; 492 LATCH (HOLDING STRUCTURE)

The invention claimed is:
1. A vehicle seat, comprising:
a main frame;
a seat cushion rotatably supported on the main frame;
a single locking element provided on one of the main frame and the seat cushion:
a receiving element that has a single receptacle portion having a recessed shape for receiving the locking element, that is provided on the other of the main frame and the seat cushion, and in which the seat cushion is fixed at a predetermined position when the locking element engages a bottom of the receptacle portion, wherein two side surfaces of the receptacle portion which oppose each other in a direction of rotation of the seat cushion are inclined to be narrowed from an opening toward the bottom and have a receiving inclined surface which guides the locking element toward the bottom; and a drive element which drives at least one of the locking element and the receiving element to advance and retract the locking element relative to the receiving element, wherein when the locking element is spaced apart from the receiving element, the seat cushion can move with respect to the main frame.

2. The vehicle seat according to claim 1, wherein the two side surfaces of the receptacle portion have, at the bottom of the receptacle portion, a locking orthogonal surface which is orthogonal to the direction of rotation of the seat cushion and which opposes the engaged locking element.

3. The vehicle seat according to claim 1, wherein the locking element has, at a portion in contact with the receiving inclined surface, a ring member which rotationally moves when the locking element moves along the receiving inclined surface.

4. The vehicle seat according to claim 1, further comprising:
a holding structure that holds the locking element at the bottom of the receptacle portion.

5. The vehicle seat according to claim 4, wherein the holding structure includes a permanent magnet provided on one of the locking element and the receiving element, and a permanent magnet or a magnetic element provided on the other of the locking element and the receiving element, and holds the locking element by a magnetic force.

6. A vehicle seat, comprising:
a main frame;
a seat cushion rotatably supported on the main frame;
a single locking element provided on one of the main frame and the seat cushion;
a receiving element that has a single receptacle portion having a recessed shape for receiving the locking element, that is provided on the other of the main frame and the seat cushion, and in which the seat cushion is fixed at a predetermined position when the locking element engages a bottom of the receptacle portion, wherein two side surfaces of the receptacle portion which oppose each other in a direction of rotation of the seat cushion are inclined to be narrowed from an opening toward the bottom and have a receiving inclined surface which guides the locking element toward the bottom;
a drive element which drives at least one of the locking element and the receiving element to advance and retract the locking element relative to the receiving element; and
a holding structure that holds the locking element at the bottom of the receptacle portion, the holding structure includes a permanent magnet provided on one of the locking element and the receiving element, and a permanent magnet or a magnetic element provided on the other of the locking element and the receiving element, and holds the locking element by a magnetic force.

* * * * *

UNITED STATES PATENT AND TRADEMARK OFFICE
CERTIFICATE OF CORRECTION

PATENT NO. : 10,960,805 B2
APPLICATION NO. : 16/571567
DATED : March 30, 2021
INVENTOR(S) : Tetsuya Nagai et al.

Page 1 of 1

It is certified that error appears in the above-identified patent and that said Letters Patent is hereby corrected as shown below:

In the Specification

In Column 7, Line(s) 60, delete "FIG. 91" and insert --FIG. 9B--, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*